US006438241B1

(12) United States Patent
Silfvast et al.

(10) Patent No.: US 6,438,241 B1
(45) Date of Patent: Aug. 20, 2002

(54) MULTIPLE DRIVER ROTARY CONTROL FOR AUDIO PROCESSORS OR OTHER USES

(75) Inventors: Scott W. Silfvast, Woodside; Kent A. Suzuki, Oakland; Arthur H. Zarnowitz, San Jose, all of CA (US)

(73) Assignee: Euphonix, Inc., Palo Alto, CA (US)

( * ) Notice: Subject to any disclaimer, the term of this patent is extended or adjusted under 35 U.S.C. 154(b) by 0 days.

(21) Appl. No.: 09/027,581

(22) Filed: Feb. 23, 1998

(51) Int. Cl.[7] .................................................. H04B 1/00

(52) U.S. Cl. ......................... 381/119; 307/112; 84/625; 84/660

(58) Field of Search ................................ 381/119, 120; 200/11 R–11 TW, 17 R–18; 307/112; 326/93; 84/625, 660

(56) References Cited

U.S. PATENT DOCUMENTS

| | | | | |
|---|---|---|---|---|
| 3,916,317 A | * 10/1975 | Gibson et al. | .............. | 325/455 |
| 4,879,751 A | * 11/1989 | Franks et al. | ............... | 381/119 |
| 5,257,317 A | * 10/1993 | Stavrou | ...................... | 381/119 |
| 5,450,075 A | * 9/1995 | Waddington | ................ | 340/870 |
| 6,118,283 A | * 8/2000 | Cripe | ......................... | 324/660 |

* cited by examiner

*Primary Examiner*—Duc Nguyen
*Assistant Examiner*—Lun-See Lao
(74) *Attorney, Agent, or Firm*—U. P. Peter Eng; Wilson Sonsini Goodrich & Rosati

(57) ABSTRACT

A rotary control for control surface on a processor, like on a large scale audio mixer or other system, includes an illuminated display for angular position, such as lights arranged in an arcuate pattern indicating the value of a parameter by an angular position, on the top of the knob. By placing the display directly on the top of the knob, a crisp illumination is provided allowing an operator to obtain rapid visual feedback concerning the parameters under control. Furthermore, the display allows a variety of display modes, which are suited to the particular parameter under control. The rotary control comprises a stator mounted on the control surface which has a proximal end adjacent to control surface and a distal end. An array of lights is mounted on the distal end of the stator and arranged in an arcuate pattern. A rotor is mounted on the stator, and operable by an operator. The rotor has a shape near the distal end so that the array of lights is visible to the operator. A sensor is coupled with the rotor which senses its relative rotation. Circuitry coupled to the sensor and the array of lights is adapted to connect the sensor and the array of lights to the audio processor so that the audio processor controls illumination of the array of lights in response to the sensor and computer control to indicate a value of a parameter under control by an angular position of illuminated lights in the arcuate pattern.

64 Claims, 8 Drawing Sheets

MULTIPLE DRIVER ROTARY CONTROL FOR AUDIO PROCESSORS OR OTHER USES

BACKGROUND OF THE INVENTION

1. Field of the Invention

The present invention relates to the field of rotary controls, such as knobs used on audio mixer control surfaces, and in other environments that support adjustment of parameters by an operator using a rotary control.

2. Description of Related Art

Large scale mixing consoles are used in the audio production industry, and elsewhere, to produce music and other audio effects. For example, studios used by artists, producers or engineers use large scale mixing consoles to produce music, dialog and sound effects for compact discs, television or film on a project by project basis. A large number of audio channels are fed into a mixing console. Each channel of the mixing console includes a number of functions such as equalizer functions, dynamics processors, gain controls, and the like. Using the audio mixing console, an operator is able to manage the characteristics of the functions being used in a particular channel and to combine all the channels to a smaller number of channels producing a final mixed product. Modem digital mixing systems apply computer power and software flexibility to enhance, automate and streamline the mixing process that has traditionally largely relied upon manual control.

In the mixing systems, there are often hundreds of rotary controls used to set parameters involved in the functions in the channels. An operator therefore is faced with a complex board. In order to read the parameters set by the rotary controls on the board, it is important that the operator be able to see the position of the rotary knobs, or otherwise determine the value of the parameter controlled by that knob.

Traditional systems have used mechanically positioned knobs with a line on the top of the knob, whose angular position indicates the relative value of the parameter. However, it is desirable to provide a lighted display for the user in order to make it easier for the operator to visually scan the board to understand the settings on the channels. Also, when the processor changes the value of the parameters in response to software rather than to an operator turning the knob, the physical position of the knob no longer reflects the actual value. So the traditional knob does not work well for systems with multiple drivers, such as systems with shared mechanical and computer control of parameters, and systems that use paging to implement multiple functions per knob.

One prior art approach is described in U.S. Pat. No. 5,450,075 entitled ROTARY CONTROL. In the '075 patent, lights are mounted on the control surface, and propagated to the top of the knobs using light pipes. As the knob is rotated, the system updates the arrangement of lights being illuminated on the control panel. These lights are transmitted up the light pipes on the sides of the knob to the top of the knob for viewing by the operator. This approach provides illumination at the top of the knob to enhance the readability of the control panel. However, it is found that alignment of the light pipes on the rotating knob with the light sources on the panel is critical to having a crisp reading. For example, if a light pipe receives light from more than one light on the panel, the reading on the top of the knob is blurred. Thus, this prior art approach is unsatisfactory on large arrays where blurred readings can aggravate the complexity of the operator's view of the control panel. The '075 patent also describes the implementation of an LCD display on the top of the knob for displaying alpha-numeric information relating to the parameter being controlled.

Another prior art approach to providing illuminated parameter values in connection with rotary controls is to mount the lights on the control panel in a skirt around the base of the knob. However, if the parameter value happens to fall behind the knob from the point of view of the operator, then it is impossible to read the value. Therefore, as the operator views a large number of knobs on the board, it will be impossible to determine the values set on a large number of these knobs.

Accordingly, it is desirable in modern systems to have a rotary control for allowing the operator to manually adjust a parameter by a mechanical knob, while at the same time or at different times, allowing the underlying processor or other drivers to adjust the parameter. The results of the adjustment by the manual operation and by the audio processor need to be accurately and clearly displayed. Furthermore, this display needs to be visible to the operator from all angles of view. Finally, it is desirable that the display provide a crisp indication of the parameter under control to avoid the blurring effects of the prior art, or other optical effects which would tend to make viewing the control panel more difficult.

SUMMARY OF THE INVENTION

The present invention provides a rotary control useful for example for a control surface on a large scale audio mixer or other audio processor, which arranges the display indicating the value of the parameter by an angular position, on the top of the knob. By placing the display directly on the top of the knob, crisp feedback is provided allowing an operator to obtain rapid visual data concerning the parameters under control. Furthermore, the crispness of the display allows a variety of display modes, which are suited to the particular parameter under control.

Thus, the invention includes a rotary control for multiple drivers comprising a stator mounted on the control surface which has a proximal end adjacent to control surface and a distal end. A display, such as an array of lights is mounted on the distal end of the stator and arranged in an arcuate pattern. A rotor is mounted on the stator, and operable by an operator. The rotor has a shape near the distal end so that the display is visible to the operator. A sensor is coupled with the rotor which senses its relative rotation. Circuitry coupled to the sensor and the display is adapted to connect the sensor and the display to a processor so that the processor controls display in response to the sensor to indicate a value of a parameter under control by illuminating a light or lights in the arcuate pattern. Processor which manages the display also receives input form other drivers for the parameter reflected on the display. For example, the knobs may be configured for multiple functions for a single mixer channel, or multiple pages of a single process under control by the processor. When the knob is reassigned amongst the functions, the processor causes display of the different value. Alternatively, the mechanical operation of the knob is supplemented with the computer operation of the underlying function, such as prestored sequences and like, related signal processing, and input from graphic user interfaces. In another alternative, the mechanical operation can be supplemented by a driver which is responsive to a remote control device, such as classic stereo volume knob operation on consumer equipment. In other examples, there are multiple mechanical devices providing input which is managed by the processor. For example, more than one knob can be used for the same parameter which are placed in different locations. Further, there may be more than two inputs which are managed by the processor that controls the display on the knob, such as multiple mechanical inputs or multiple computer sources or a combination of both.

According to one aspect of the invention, the display includes an array of lights comprised of light emitting elements, such as light emitting diodes. The light emitting elements have a first mode and a second mode. The first mode is brighter than the second mode. The processor controls the illumination of the array of lights to indicate a value of a parameter by illuminating a light emitting element in the first mode, and to indicate a characteristic of the parameter under control by illuminating at least one other element in the array in the second dimmer mode. For example, the brightness of the light emitting elements is controlled in the first mode with a current having a first duty cycle, and in the second mode with a current having a second duty cycle. The duty cycle in the first mode results in a greater percentage of time of illumination than in the second mode.

According to another aspect of the invention, the circuitry coupled to the sensor and the array of lights includes a plurality of leads which extend from the proximal end of the stator to the array of lights. The plurality of leads interconnect the respective lights in the array of lights in virtual rows and columns, so that the processor accesses lights in the array of lights for illumination by selecting the virtual rows and virtual columns of lights which are physically arranged in the arcuate pattern.

According to one preferred embodiment, the array of lights includes at least 11 lights arranged in the arcuate pattern, having a radius of less than about 0.5 inches. More preferably, the array of lights includes at least 21 lights arranged in the arcuate pattern, having a radius of less than 0.3 inches.

According to another aspect of the present invention, the rotary control includes a plate mounted near the distal end of the stator and the array of lights includes an array of light emitting diodes mounted on the plate. A mask element is mounted with the plate and includes an array of openings defining the arcuate shape of the array of lights. Lenses are mounted with the mask and the plate. The lenses provide light paths to a display plane near the distal end of the stator for light emitting elements in the array. The mask includes elements coupled with particular light emitting elements in the array to reduce or prevent light emitted from adjacent light emitting elements from entering a lens for the particular light emitting element. The display plane defined by the array of lights in one aspect of the invention is arranged substantially parallel to the control surface plane. In another embodiment, the display plane is tilted toward the operator side of the control panel relative to the control surface plane.

According to yet another aspect of the invention, the rotary control includes a push button on the distal end of the stator, and a switch mounted on the control panel coupled to the stator and arranged to be actuated by pushing the push button on the distal end of the stator. Alternatively, the push button function can be implemented by using the stator itself. In this embodiment, a switch is mounted on the panel and arranged to be actuated by pushing on the distal end of the stator.

According to another aspect of the invention, the array of lights includes at least one central light having a controllable color. Thus, the central light is mounted on the distal end of the stator inside the arcuate pattern in the array of lights. The processor controls the color of the central light to indicate information to the operator.

A wide variety of displays can be mounted on the top of the rotary control, including miniature cathode ray tubes, liquid crystal displays, light emitting diodes, magnetically driven meters, and the like. Also, a variety of encoders can be used for sensing the rotation of the knob, including optical sensors, potentiometers, gray scale sensors and the like. Furthermore, the coupling between the rotary portion of the rotary control, and the sensor can be made with a variety of gearing, including belts, gears, direct drive, or no mechanical coupling at all for optical or magnetic sensing technologies.

The present invention also comprises a rotary control module for a control surface of a processor that includes logic to control the illumination of the array of lights in response to the sensor and to programs being executed by the processor to indicate a value of a parameter under control by an angular position of the illuminated lights in the arcuate array. In this embodiment, logic coupled to the sensor manages the light emitting elements in a bright mode and in a dimmer mode. Logic is included to control the illumination of the array of lights to indicate a value of a parameter by illuminating in the bright mode a particular light emitting element, and illuminating in the dimmer mode light emitting elements in the array on one side or both sides of the particular light emitting element. Thus, the logic includes a left anchor mode, in which a particular light emitting element on the left end of the array is defined as the anchor position, and the light emitting elements in the array between the anchor position and the bright light emitting element are illuminated in the dimmer mode. Also, the logic includes a right anchor mode, in which the anchor position is on the right end of the arcuate shape. In another mode, the anchor position is in the center of the arcuate array, and elements between the bright element and the center of the arcuate array are illuminated in the dimmer mode. In a final mode, a so called floating anchor mode is provided in which the light emitting elements on one or both sides of the particular element which is luminated in the bright mode, are illuminated in the dimmer mode to indicate a characteristic of the parameter under the control, such as the Q, or bandwidth of a parameter.

In another aspect of the invention, a control surface for a processor is provided which includes a control panel, a plurality of sets of function select controls on the control panel, in which the sets are coupled to corresponding channels in the processor. A function control section is included on the control panel that includes a plurality of rotary controls such as those discussed above for setting parameters for a selected function in a selected channel. Logic is coupled to the plurality of sets of function select controls and to the function control section, which enables the processor to apply a selected function in a selected channel to the rotary controls in the function control section for that channel.

Accordingly, the present invention solves significant market problems associated with the difficulty of use of large scale audio mixing consoles in the prior art. The present invention solves these problems with a virtual rotary knob design, with both manual and processor control, having illumination on the top surface of the knob of the value of the parameter under control, as well as an indication of the mode of operation of the control.

The multiple driver rotary control the present invention has application in mixing consoles and other signal processing equipment and devices in the audio production industry. Also audio controls and video controls used in the video production industry may include knobs according to the present invention. Home audio equipment such as Hi-Fis, amplifiers, CD players, DVD players, tape decks, tuners and the like, and automotive audio electronics such as car stereos also include knobs which could be implemented according to the present invention. In other fields such as medical instrumentation, scientific instrumentation, and industrial and process control instrumentation include systems having knobs which could be implemented according to the present invention.

Overall the present invention provides an improved technology for use at large scale recording and mixing installations that require premium audio fidelity and high degree of computer automation and integration. The controls improve the ability of the operator to use intuitive sensing of the state of a large number of parameters under control, and maintain the tactile features of traditional mixing consoles, allowing comprehensive operator feedback on the control surface.

Other aspects and advantages of the present invention can be seen upon review of the figures, the detailed description and the claims which follow.

DETAILED DESCRIPTION

Figure 1:
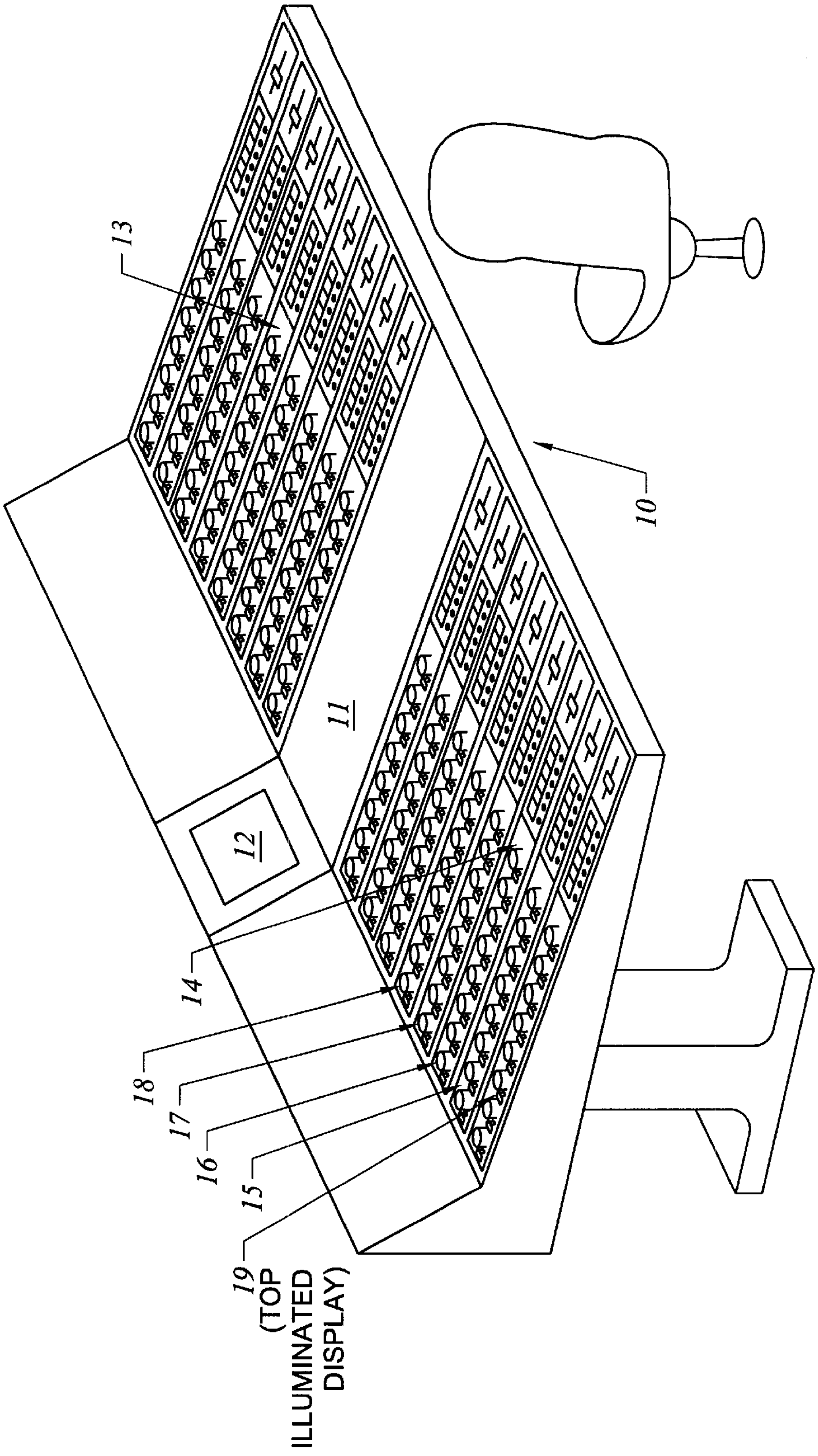
FIG. 1 is a simplified diagram of a large scale mixing console having top illuminated rotary controls according to the present invention.

A detailed description of preferred embodiments is provided with respect to the figures, in which FIG. 1 provides a simplified, perspective view of a large scale mixer console according to the present invention. As can be seen in FIG. 1, the mixer console includes a control surface 10. The control surface includes a central region generally 11, that includes a variety of controls and buttons for overall management of the mixing console. In the central region 11, control surfaces for audio mixers typically include a CRT display 12 which provides a graphical user interface for computer control of the mixer. Also, the control surface 10 includes a plurality of modules for controlling channels of audio represented by the region 13 and the region 14 on either side of the central region 11. In the region 14, four strips of controls are labeled corresponding to the controls for four channels on the mixer, including strips 15, 16, 17 and 18. In a actual system, there are dozens of channels, and correspondingly dozens of strips of controls for such channels. Thus, the ease of use and ready display of information concerning the parameters under control in the large number of channels critical to a usable mixer console is provided by the top illuminated displays (labeled, as shown) on the rotary controls, such as control 19. Furthermore, the operator develops a skill with these processors that allows the use of peripheral vision and intuitive sensing of the settings used for a particular piece of music or other audio. Thus, a brilliant, crisp display fuctionality, such as provided by the top mounted display on the rotary controls of the present invention is important.

Figure 2:
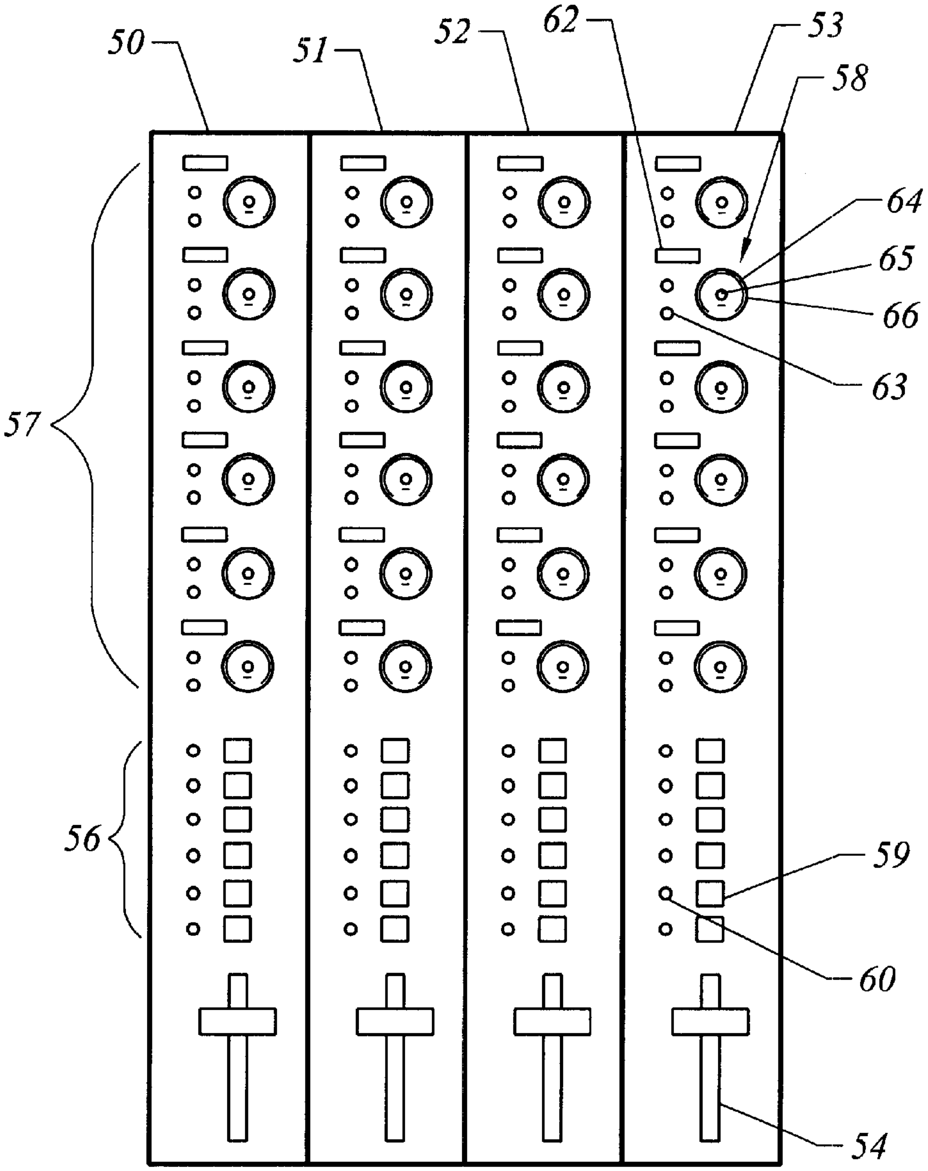
FIG. 2 illustrates the layout of the control surface for four channels in the audio processor of FIG. 1.

FIG. 2 provides a more detailed layout view of a module on the control surface, including the control elements for four channels. Thus, channel modules 50, 51, 52 and 53 are illustrated in FIG. 2. Module 53 is representative. It includes a fader 54, a set 56 of function select keys, and a set 57 of rotary controls, such as rotary control 58. The function select keys in the set 56 include individual buttons 59 for enabling the connection of the set of rotary controls 57 to a particular function under control. Also, the function select section 56 includes corresponding in/out buttons 60, by which to connect the corresponding function into the channel or out of the channel. When a particular function has been selected by depressing a function select key, such as key 59, a process applies the rotary controls in the set 57 of rotary controls to parameters defined for the selected function.

Each rotary control, such as control 58, also includes an alpha-numeric display element 62 for indicating the parameter under control by the rotary control 58, or other factors. Also, control buttons, such as button 63 are coupled with the rotary control 58.

According to the present invention, the rotary control 58 includes an display on top of the knob. In the example shown, the display includes an array of lights, such as light emitting diodes arranged in an arcuate pattern 64. Also, a center light 65 is included in the rotary control which in the preferred embodiment has a controllable color. The controllable color is utilized to provide feedback to the operator concerning the parameter under control.

The module 53 for the channel includes circuitry for coupling the controls to the host processor, so that the host processor controls illumination of the array of lights in the arcuate pattern 64 to indicate the value under control by the rotary control 58. The display provided by the arcuate pattern of LEDs 64 on the rotary control 58 is mounted at the top of the control, and is stationary. A sheath shaped rotor 66 surrounds the display and allows the user to rotate the rotor 66 to indicate to the host computer adjustment of the parameter, by an amount of angular rotation of the rotor 66.

Figure 3:
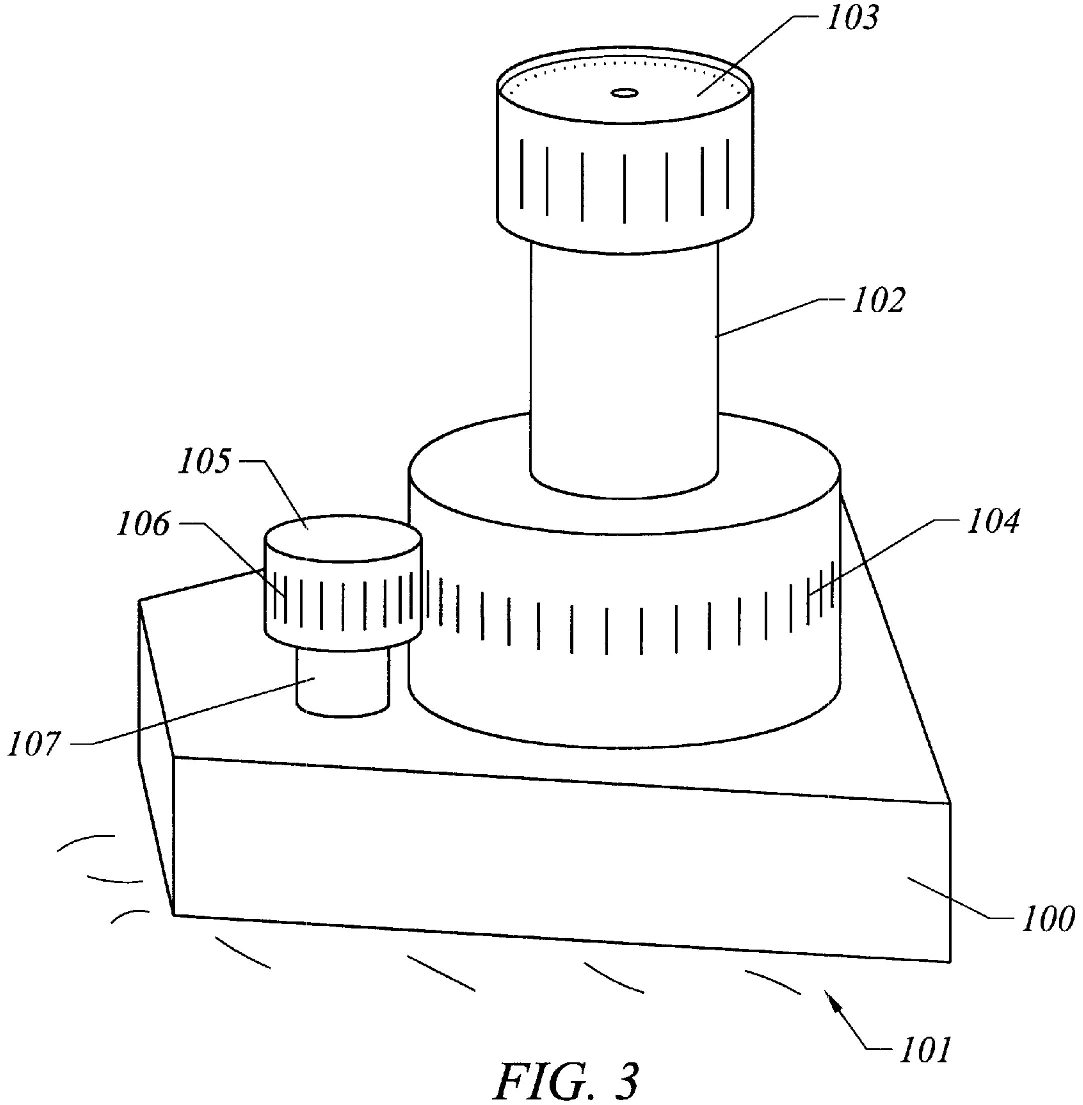
FIG. 3 is a simplified perspective drawing of a rotary control for use in the control panel of FIGS. 1 and 2.

FIG. 3 provides a simplified perspective view of one embodiment of the rotary control of the present invention. The rotary control includes a base 100 which is mounted on the control surface 101. A rotor 102 surrounds an interior stator (not shown) which supports a display 103 which is arranged so that it is visible, and stationary at the top of the rotor 102. The rotor 102 includes a gear 104 which is coupled to a sensor 105. The sensor 105 includes gears 106 that turn a post 107 in response to rotation of the rotor 102. The turning of the post is sensed by a potentiometer, by optical sensing techniques, by magnetic sensing techniques or the like which are commercially available, in order to indicate amount of rotation of the rotor 102.

The display 103 defines a display plane at or near the top of the rotor 102 to allow for easy viewing by the operator. The display plane of the display 103 is in one preferred embodiment substantially parallel to the plane of the control surface 101. In other embodiments, the display plane of the display 103 is tilted toward the operator relative to the surface of the control panel 101.

In a preferred embodiment, the display 103 includes an array of light emitting diodes LEDs. In alternative systems, liquid crystal displays, small cathode ray tubes, meters with magnetically or electrically controlled needles, or other display elements can be utilized as the display technology.

Figure 4:
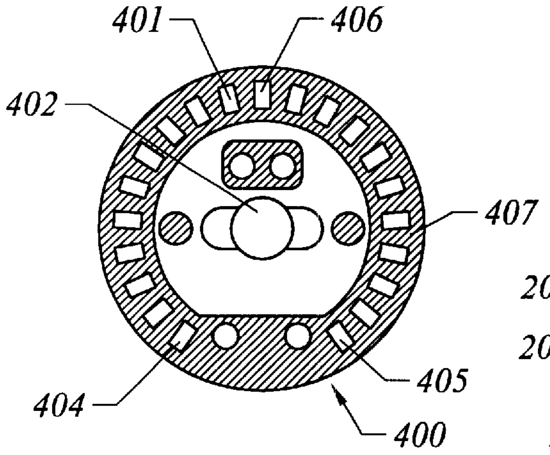
FIG. 4 illustrates the layout of the top of a rotary control according to one embodiment of the present invention.
Figure 5:
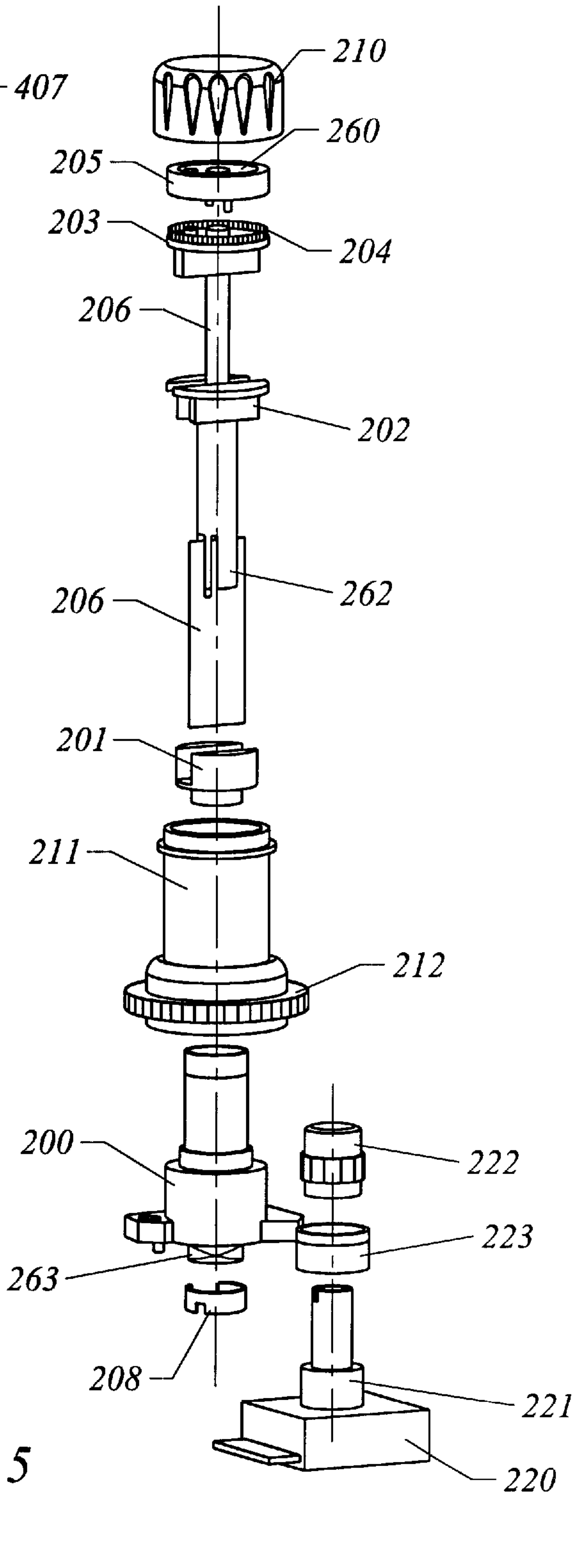
FIG. 5 is an exploded view of one rotary control according to the present invention.

FIGS. 4 and 5 illustrate structural components of one example of the rotary control according to the present invention. In FIG. 4, a display plate 400 is illustrated. The display plate includes an arcuate array of lenses 401 mounted in a mask 407 for corresponding light emitting diodes which are mounted on the top of the stator element of the rotary control. Also, a central lens 402 for the variable color LED is included. In the embodiment of FIG. 4, there are 21 LEDs in the arcuate array 401. Eleven or more, and more preferably as in the illustrated example, twenty-one LEDs or more are arranged in an arcuate pattern extending from about 7 o'clock to about 5 o'clock. The radius of the arcuate array is about 0.5 inches or less, and more preferably as in the illustrated example about 0.3 inches. In alternative systems, the arcuate array can extend entirely around the circle. Also, other arcuate patterns can be utilized as suits a particular implementation.

FIG. 5 provides an exploded view of one rotary knob implemented according to the present invention. The knob includes a stator which is composed of a base 200, a stator bracket 201, a stem 202 adapted to fit within the bracket 201 on the top of the base 200, a printed circuit board 203 supporting the array of diodes 204 and a lens assembly/cap 205. A flexible cable 206 extends from the printed circuit board 204 through the base 200 for connection to the underlying printed circuit board with which the assembly is mounted. The flexible cable 206 folds in a cylindrical shape to fit with the stem. A retaining bracket 208 is included with the base element 200.

A rotor element is comprised of a "tire" 210 and rotor body 211. The tire 210 snaps on a rotor body 211. The stator element when collapsed is fixed on the base 200. The rotor element 211 rides over a bearing surface on the base 200. The tire element 201 provides a surface for the user to touch and rotate the rotor element base 211 and has a shape on the distal end allowing viewing of the display on the stator.

The rotor element base 211 includes a gear 212. The base 211 is coupled with a gear base 220 which includes a sensor stator 221 and a mating gear 222. Sensor stator 221 extends up through the bracket 223 which is coupled to the base 200 of the knob stator assembly. A gear 212 and gear 222 mate. The base 220 includes a counter or other sensor for detecting the angular rotation of the rotary element base 211. The angular rotation provided by mechanical input is coupled to a processor via a circuit in the base 220, which controls the display on the printed circuit board 203.

The knob rotary element includes the tire 210 at the distal end. Proximal end of the rotary element includes the gear 212. The outside diameter of the tire 210 provides tactile region for the knob, in one implementation is about 0.8 inches in diameter. The inside diameter of the tire 210 within which the display on the stator assembly is mounted is about 0.667 inches in diameter in this example embodiment. Height of the rotor assembly in this example is about 1.5 inches.

The stem 202 used with the stator of FIG. 5 can also be used to implement a push button function. A push button can be mounted on the display surface 260 (not shown) or the proximal end 262 of the stem 202 can be coupled with a switch 263 schematically illustrated in the figure, which is actuated by pushing down on the top of the stator. The switch can be used for operation of various select functions during operation of the rotary control as suits a particular implementation. Also, the knob assembly is made touch sensitive in an alternative embodiment. For example, the rotary assembly includes conductive material, and changes capacitance or inductance when touched. By sensing the change, a signal is generated for use in the processor.

Figure 6:
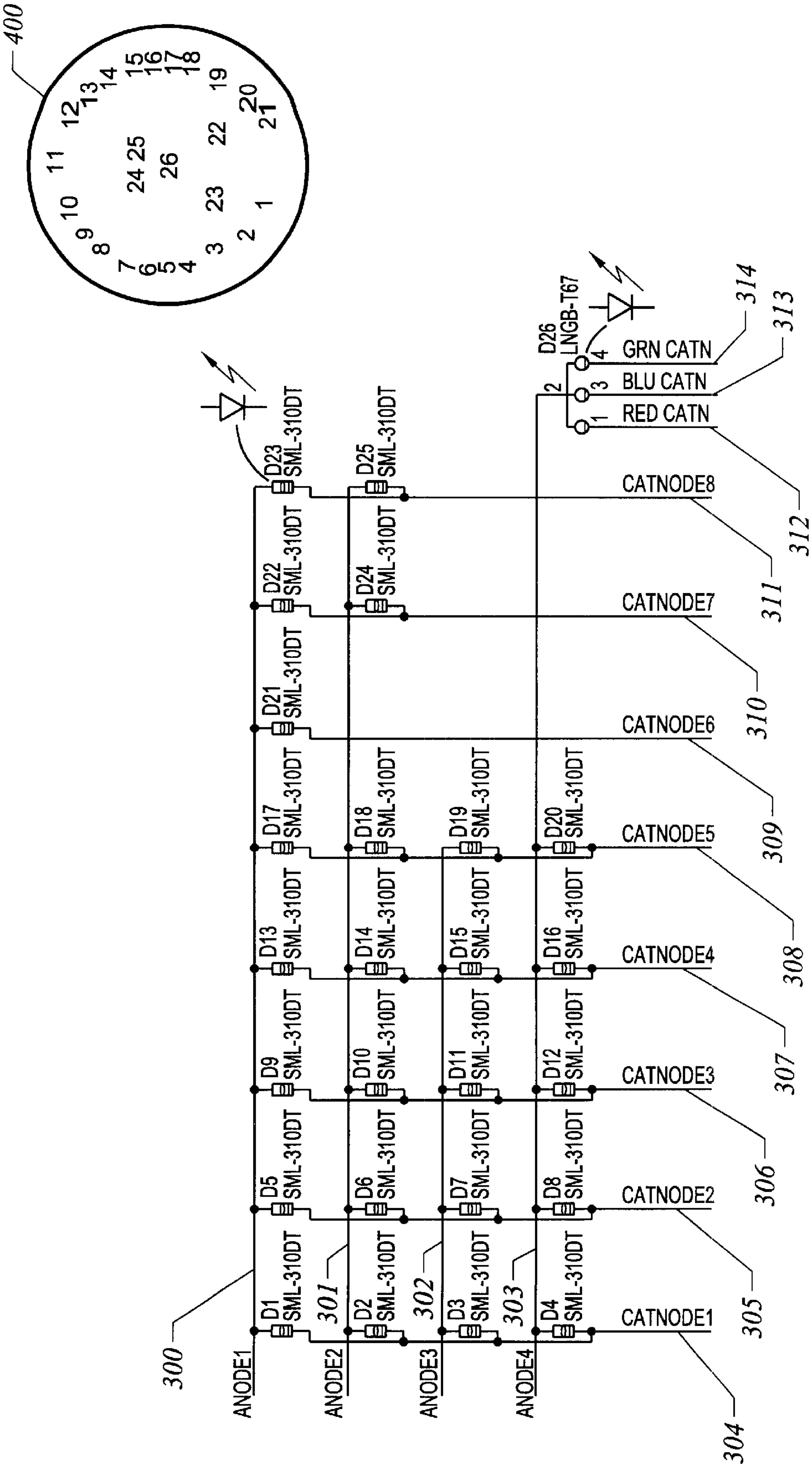
FIG. 6 is schematic diagram of the light emitting diodes used in the embodiment of FIG. 5.

Although the LEDs are physically laid out in an arcuate array, the wiring is organized in virtual rows and columns such as illustrated in FIG. 6. Thus, by addressing each individual light emitting diode by its row and column in a scanning fashion, the control logic for the rotary control is able to control the illumination of the LEDs in a variety of modes. For example, in the preferred system, each LED has a brighter mode, and a dimmer mode. In the brighter mode for example, the duty cycle of the current used to illuminate LED is about 1/8. In the dimmer mode, the duty cycle used to light the LED is about 1/64. Of course the duty cycles utilized depend on the types of LEDs selected, the brightness desired and the amount of current available for a particular implementation.

Thus as can be seen in FIG. 6, there is an array of LEDs (D1–D26) logically arranged in rows and columns. The physical layout of the array of LEDs is represented by the field 400 in FIG. 6, where the number in the field 400 corresponds to the location of the LED D1–D26 on the display face. Thus, a first row of LEDs includes LEDs D1, D5, D9, D13, D17, D21, D22 and D23. The anodes of the first row of LEDs are coupled to line 300. The second row of LEDs have their anodes coupled to line 301. Second row includes diodes D2, D6, D10, D14, D18, D24, D25. The third row of LEDs have their anodes coupled to anode line 302. The third row includes diodes D3, D7, D11, D15, D19. The fourth row of LEDs have their anodes coupled to anode line 303. The fourth row of LEDs includes LEDs D4, D8, D12, D16, D20, D26, where LED D26 is a color vise having red, green and blue components.

The cathodes of columns of LEDs are coupled to respective cathode lines 304–314. Thus, diodes D1–D4 are coupled to cathode line 304. Diodes D5–D8 are coupled to cathode line 305. Diodes D9–D12 are couple to cathode line 306. Diodes D14–D16 are coupled to cathode line 307. Diodes D17–D20 are coupled to cathode line 308. Diode D21 is coupled to cathode line 309. Diodes D22 and D24 are coupled to cathode line 310. Diodes D23 and D25 are coupled to cathode line 311. The red cathode of the color LED D26 is coupled to cathode line 312. The blue cathode is coupled to cathode line 313. The green cathode is coupled to cathode line 314. These fourteen lines are mounted on a flexible printed circuit cable which is mounted inside the stator element of the knob and coupled to a zisk connector on the printed circuit card. The diode in a preferred embodiment array of diodes includes 25 SML-310DT diodes. The color diode is a LHGP-T676B. The embedded processor is able to drive the array of LEDs with the duty cycles desired to create a variety of display modes as discussed in more detail below.

Figure 7:
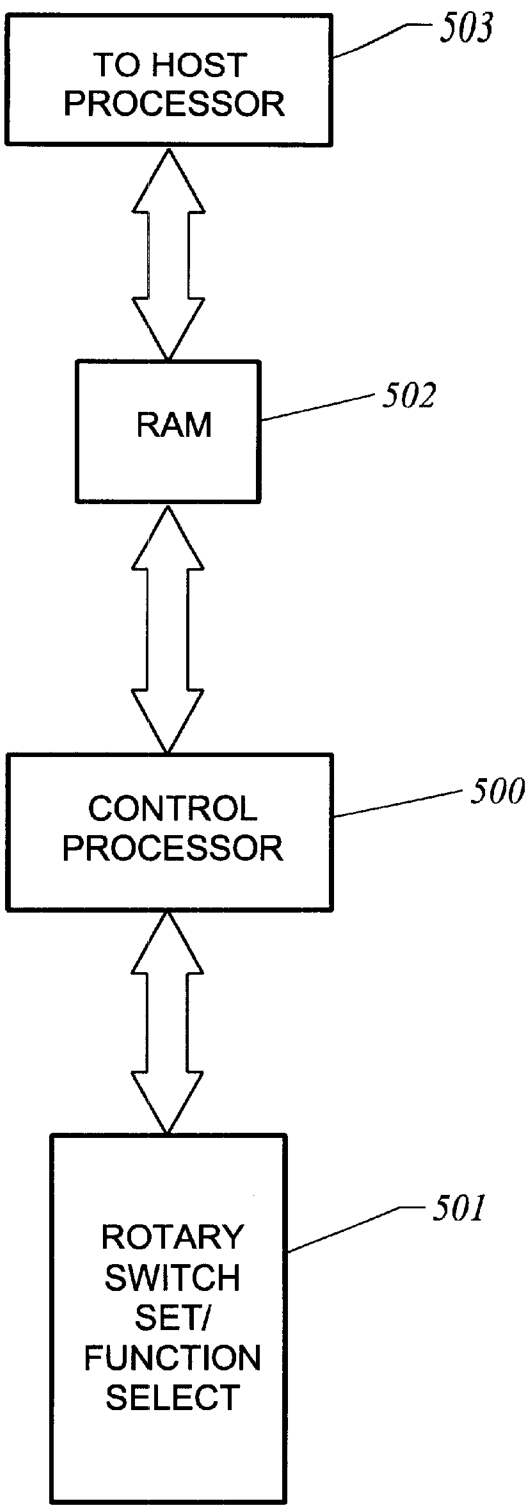
FIG. 7 is a simplified block diagram of the control logic for a rotary control module and host processor according to the present invention.

FIG. 7 provides a simplified diagram of the control logic utilized for managing the rotary controls in the channels of the present invention. Thus, in one example embodiment one or more control channels on the display surface, such as channel 53 of FIG. 2, shares control processor 500. The processor 500 is coupled to the channel controls 501, including rotary switch sets and function select switches, and to a memory 502 implemented with a dual port random access memory RAM. Also, the host processor 503 is able to access the dual port RAM 502. The processor 500 scans the channel controls 501 in the strip 53 and updates the data structures in the RAM 502 as appropriate. The host processor similarly scans the RAM 502, and in response to processing inputs from other drivers of the parameter, updates the parameters for display on the channel controls 501 as appropriate. Furthermore, the host processor controls the modes of operation executed by the processor 500 by communication through the dual port RAM 502.

Figure 8A:
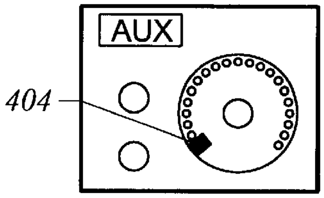
FIGS. 8A and 8B illustrate a left anchor mode of operation for the rotary control of the present invention.
Figure 8B:
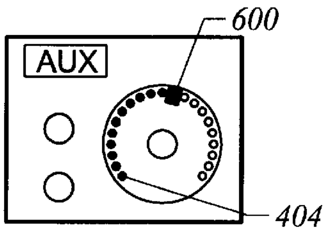

FIGS. 8A and B, 9A and B, 10A and B, and 11A, B and C illustrate a variety of display modes implemented according to the present invention using the top mounted display for the rotary control. In FIGS. 8A and 8B, the left anchor mode is illustrated. As shown in FIG. 8A, in the left anchor mode, when the parameter is zero or another anchor value, the left most light 404 is illuminated brightly (light 404 is labeled in FIG. 4 for comparison). As the parameter value is changed by rotating the knob clockwise, or by host processor control, the bright element moves in a clockwise fashion to indicate the current value of the parameter such as by illuminating element 600. All of the LEDs to the left of point 600 extending to the anchor LED 404 are illuminated in the dimmer mode. In this embodiment, the ring on the display is anchored on the left side of the knob as the user turns it. The brightest LED indicates the actual position of the value of the function. This mode of operation is useful for example in indicating the gain in an auxiliary send channel.

Figure 9A:
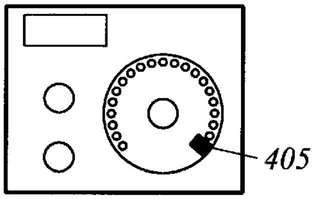
FIGS. 9A and 9B illustrate a right anchor mode of operation for the rotary control of the present invention.
Figure 9B:
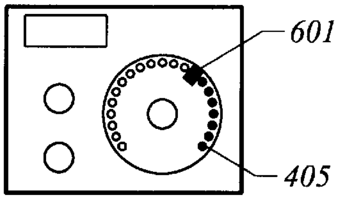

FIGS. 9A and 9B illustrate the right anchor mode. In the right anchor mode, the knob operates in a similar fashion, except when the value is at the starting position, the-right most LED 405 (LED 405 is also labeled in FIG. 4 for comparison) is illuminated bright. As the value changes, the bright LED 601 moves counterclockwise, while all of the LEDs between the point 601 and the point 405 are illuminated in the dimmer mode. In this embodiment, the ring is anchored on the right side of the knob as the user turns it. The brightest LED 601 indicates the actual position of the value of the function.

Figure 10A:
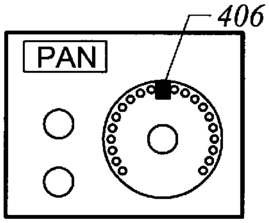
FIGS. 10A and 10B illustrate a center anchor mode of operation for the rotary control of the present invention.
Figure 10B:
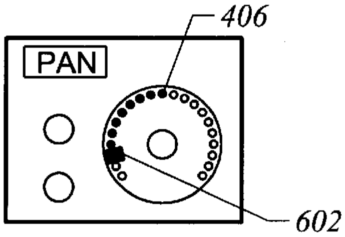

FIGS. 10A and 10B illustrate the center anchor mode according to the present invention. According to the center anchor mode the starting position is at 12 o'clock on the dial represented by LED 406 (see FIG. 4 for comparison). As the user adjusts the knob, or the audio processor changes the parameter, the bright LED moves to either the left or the right to a position, such as position 602. All of the LEDs between the position 602 of the current value, and the LED 406 are illuminated in the dimmer mode. In this mode the ring is anchored at the center of the knob as the user turns it left or right of center. The brightest LED indicates the actual position of the value of the function. This center anchor mode is useful for example for the pan function.

Figure 11A:
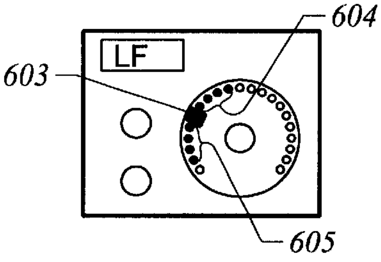
FIGS. 11A–11C illustrate the operation of a floating anchor mode for operation of the LEDs for the rotary control of the present invention.
Figure 11B:
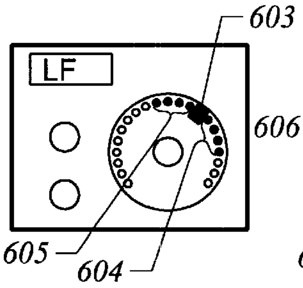
Figure 11C:
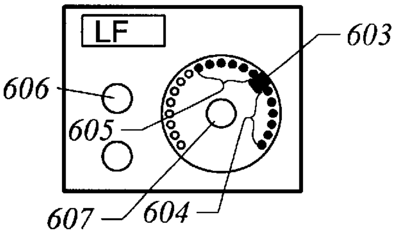

FIGS. 11A–11C illustrate the floating anchor mode according to the present invention. According to the floating anchor mode, the position of the bright LED 603 is controlled by rotation of the knob or by the audio processor. The LEDs in the arcuate array which are lighted in the dimmer mode include LEDs 604 on the right side of the bright LED 603, and LEDs 605 on the left side of the bright LED 603. The number of LEDs in the sets 604 and 605 depends on a characteristic of the parameter under control, such as the Q of the filter or other secondary function. Thus, if the knob is selected to indicate the low frequency gain of the channel, the Q is indicated by the width of the dim LEDs in the sets 604 and 605, and the value of the center of the low frequency filter is indicated by the bright LED 603. As a user rotates the knob, or the audio processor varies the function, the bright LED 603 rotates with the dimmer sets of elements 604 and 605. In order to change the Q of the function, the operator actuates a push button, such as the select button 606 associated with the rotary control, or a push button, such as button 607 on top of the rotary control. By rotating the knob, or by audio processor control, the Q of the function is adjusted so that width of the set of LEDs on the left 605 and width of the set of LEDs on the right 604 increase or decrease as appropriate.

Figure 12:
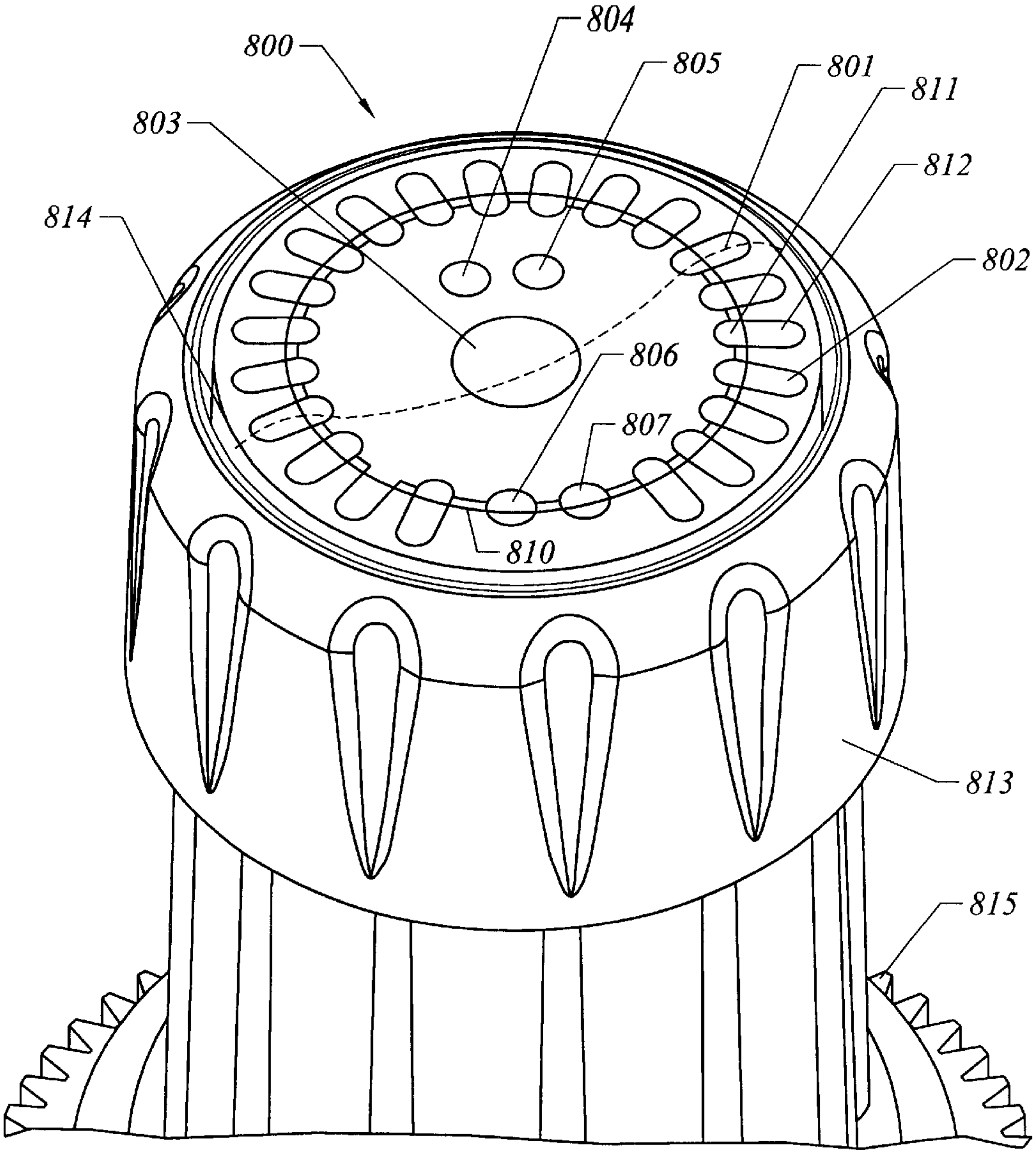
FIG. 12 is a perspective view of a preferred knob configuration with a convex/concave top surface.

FIG. 12 provides a perspective view of a preferred implementation of the knob according to the present invention, in which the top surface 800 of the knob has a convex/concave contour as can be seen by the dashed line 801. The knob shown in FIG. 12 illustrates an array of lenses, such as lens 802, arranged in an arcuate pattern as discussed above. A central lens 803 also acting as a center of a push button function, is used for a color LED. Other LEDs 804, 805, 806, 807 are also visible through lenses in the surface 800 of the knob.

As can be seen by the convex/concave contour 801, a rim 810 is positioned on the surface 800 so that it intersects the lenses (e.g. 802). This establishes a surface, such as surface 811 inside the rim, facing the center of the knob on the concave portion of the contour, and a surface 812 outside the rim, facing away from the center of the knob on the convex portion of the contour 801. In this way, the lenses are provided with a configuration that facilitates viewing of the lighted LEDs from a wide range of angles. The display surface 800 is formed on the top of the stator 814, and surrounded by a tire 813 which is configured of a size and shape to allow for a comfortable adjustment by an operator. The tire 813 is rotatable relative to the surface 800 as discussed above. Rotation of the tire 813 results in rotation of the gear 815, which allows for sensing of the mechanical positioning of the knob by an operator, without changing the position of the display surface 800.

Accordingly, a rotary control for use with an audio mixing consoles been provided that provides a display on the top surface position of the knob with indication of the parameter under control, the mode of operation, and secondary functions associated with the parameter under control. The display provides a crisp clear indication to the operator of the console unavailable with prior art systems. The invention is suitable to a variety of display types and encoder types for displaying parameters, and detecting the rotation of the knob. The improved visual feedback provided by the knob of the present invention is essential for long term mixing console market acceptance. Furthermore, the knob is suitable for a variety of industrial, scientific, engineering and medical instrumentation uses in which clear feedback is required for operators of complex equipment using rotary controls.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A rotary control for a processor comprising:

a stator having a proximal end and a distal end;

a display arranged to provide display of an angular position on the distal end of the stator;

a rotor, mounted on the stator, rotatable by an operator, and having a shape near the distal end of the stator so that the display is visible to the operator;

a sensor coupled with the rotor, which senses rotation of the rotor; and circuitry coupled to the sensor and the display adapted to connect the sensor and the display to the processor so that the processor controls the angular position on the display, in response to the sensor, to indicate a value of a parameter under control by the angular position.

2. The rotary control of claim 1, wherein the display comprises an array of lights arranged in an arcuate pattern, and the angular position is indicated by illumination of a light or lights in the array of lights.

3. The rotary control of claim 2, wherein the lights in the array of lights comprise light emitting elements having a first mode and a second mode, the first mode being brighter than the second mode, so that the audio processor controls the illumination of the array of lights, in response to the sensor, to indicate a value of a parameter by illuminating a light emitting element in the first mode, and to indicate a characteristic of the parameter under control by illuminating at least one other light emitting element in the array in the second mode.

4. The rotary control of claim 3, wherein the light emitting elements comprise light emitting diodes which are illuminated in response to a current, and wherein the current has a first duty cycle in the first mode and has a second duty cycle in the second mode.

5. The rotary control of claim 2, wherein the circuitry includes a first plurality of leads and a second plurality of leads extending form the proximal end of the stator to the array of lights, and wherein the first plurality of leads are coupled to respective sets of lights in the array along a virtual rows, and the second plurality of leads are coupled to respective sets of lights in the array along a virtual columns, so that the processor accesses lights in the array of lights for illumination by selecting the virtual rows and virtual columns.

6. The rotary control of claim 1, wherein the sensor includes a gear coupled to the rotor, and logic coupled with the circuitry which counts degrees of rotation of the gear.

7. The rotary control of claim 1, wherein the sensor includes an optical sensor mounted on the control surface coupled with the circuitry.

8. The rotary control of claim 1, wherein the stator includes a cylindrical bearing surface between the proximal and distal ends of the stator, and the rotor is adapted to fit on the bearing surface of the stator.

9. The rotary control of claim 2, wherein the array of lights includes at least 11 lights arranged in the arcuate pattern.

10. The rotary control of claim 9, wherein the arcuate pattern has a radius of about 0.5 inches or less.

11. The rotary control of claim 2, wherein the array of lights includes at least 21 lights arranged in the arcuate pattern having a radius of about 0.3 inches or less.

12. The rotary control of claim 2, including:

a plate mounted near the distal end of the stator; and wherein the array of lights includes:

an array of light emitting elements mounted on the plate;

a mask element mounted with the plate, including an array of openings defining the arcuate shape of the array of lights; and an array of lenses mounted with the mask and the plate, including lenses for providing light paths to a display plane near the distal end of the stator for light emitting elements in the array of light emitting elements.

13. The rotary control of claim 12, wherein the mask includes elements coupled with particular light emitting elements in the array to reduce or prevent light emitted from adjacent light emitting elements from entering a lens for the particular light emitting element.

14. The rotary control of claim 1, wherein the processor includes a control surface which defines a control surface plane, and the display is arranged to provide a display plane, the display plane is substantially parallel with the control surface plane.

15. The rotary control of claim 1, wherein the processor includes a control surface arranged to have an operator side on which the operator is normally positioned during operation of the rotary control, and defining a control surface plane, and the display is arranged to provide a display plane, the display plane is tilted toward the operator side relative to the control surface plane.

16. The rotary control of claim 1, including:

a switch mounted on the panel, coupled to the stator, arranged to be actuated by pushing the distal end of the stator, and coupled to the circuitry for connection to the audio processor.

17. The rotary control of claim 1, including:

a push button on the distal end of the stator; and a switch mounted on the panel, coupled to the stator, arranged to be actuated by pushing the push button on the distal end of the stator.

18. The rotary control of claim 2, wherein the array of lights includes at least one central light having a controllable color mounted on the distal end of the stator, inside the arcuate pattern so that the audio processor controls the color of the central light to indicate information to the operator.

19. The rotary control of claim 1, including a touch sensitive element on at least one of the rotor and the stator.

20. The rotary control of claim 1, wherein the display comprises a display surface having a convex outer region, and a concave inner region, establishing a rim between the convex outer region and convex inner region.

21. The rotary control of claim 2, wherein the display comprises a display surface having a convex outer region, and a concave inner region, establishing a rim between the convex outer region and convex inner region, and further comprises a plurality of lenses mounted in the display surface such that the lenses include a first portion on the convex outer region of the display surface, and a second portion on the concave inner region of the display surface.

22. The rotary control of claim 21, wherein at least one central light is located in the concave inner region of the display surface.

23. A rotary control module for a control surface of an audio processor, comprising:

a stator mounted on the control surface, the stator having a proximal end adjacent the control surface and a distal end;

an array of lights on the distal end of the stator, the array of lights arranged in an arcuate pattern;

a rotor, mounted on the stator, rotatable by an operator, and having a shape near the distal end of the stator so that the array of lights is visible to the operator;

a sensor coupled with the rotor, which senses rotation of the rotor; and logic coupled to the sensor, the array of lights, and the processor, to control the illumination of the array of lights, in response to the sensor and the processor, to indicate a value of a parameter under control by an angular position of illuminated lights in the arcuate pattern.

24. The rotary control module of claim 23, wherein the lights in the array of lights comprise light emitting diodes.

25. The rotary control module of claim 23, wherein the lights in the array of lights comprise light emitting elements having a first mode and a second mode, the first mode being brighter than the second mode, and including logic responsive to the processor and the sensor, to control the illumination of the array of lights to indicate a value of a parameter by illuminating a light emitting element in the first mode, and to indicate a characteristic of the parameter under control by illuminating at least one other light emitting element in the array in the second mode.

26. The rotary control module of claim 23, wherein the lights in the array of lights comprise light emitting elements having a bright mode and a dimmer mode, and including logic responsive to the processor and the sensor, to control the illumination of the array of lights in to indicate a value of a parameter by illuminating in the bright mode a particular light emitting element, and illuminating in the second mode light emitting elements in the array between the particular light emitting element and an anchor position in the array of lights.

27. The rotary control module of claim 26, wherein the logic includes a left anchor mode in which the anchor position is on the left end of the arcuate shape, and a right anchor mode in which the anchor position is on the right end of the arcuate shape.

28. The rotary control module of claim 26, wherein the logic includes a center anchor mode in which the anchor position is in the center of the arcuate shape.

29. The rotary control module of claim 23, wherein the lights in the array of lights comprise light emitting elements having a bright mode and a dimmer mode, and including logic responsive to the processor and the sensor, to control the illumination of the array of lights in to indicate a value of a parameter by illuminating in the bright mode a particular light emitting element, and illuminating in the dimmer mode light emitting elements in the array on one side or both sides of the particular light emitting element.

30. The rotary control module of claim 29, wherein the logic in the floating anchor mode controls illumination of the light emitting elements on one side or both sides of the particular element to indicate a characteristic of the parameter under control.

31. The rotary control module of claim 30, wherein the characteristic comprises Q.

32. The rotary control module of claim 30, wherein the characteristic comprises bandwidth.

33. The rotary control module of claim 23, wherein the sensor includes a gear coupled to the rotor, and logic coupled with the circuitry which counts degrees of rotation of the gear.

34. The rotary control module of claim 23, wherein the sensor includes an optical sensor mounted on the control surface coupled with the circuitry.

35. The rotary control module of claim 23, wherein the array of lights includes at least 11 lights arranged in the arcuate pattern.

36. The rotary control module of claim 35, wherein the arcuate pattern has a radius of about 0.5 inches or less.

37. The rotary control module of claim 23, wherein the array of lights includes at least 21 lights arranged in the arcuate pattern having a radius of about 0.3 inches or less.

38. The rotary control module of claim 23, wherein the control surface defines a control surface plane, and the array of lights is arranged so that illumination provides a display plane, the display plane is substantially parallel with the control surface plane.

39. The rotary control module of claim 23, wherein the control surface is arranged to have an operator side on which the operator is normally positioned during operation of the rotary control, and defines a control surface plane, and the array of lights is arranged so that illumination provides a display plane, the display plane is tilted toward the operator side relative to the control surface plane.

40. The rotary control module of claim 23, including:

a switch mounted on the panel, coupled to the stator, arranged to be actuated by pushing the distal end of the stator.

41. The rotary control module of claim 23, including:

a push button on the distal end of the stator; and a switch mounted on the panel, coupled to the stator, arranged to be actuated by pushing the push button on the distal end of the stator.

42. The rotary control module of claim 23, wherein the array of lights includes at least one central light having a controllable color mounted on the distal end of the stator, inside the arcuate pattern so the color of the central light indicates information to the operator.

43. The rotary control module of claim 23, including a touch sensitive element on at least one of the rotor and the stator.

44. The rotary control module of claim 23, wherein the distal end of the stator comprises a display surface having a convex outer region, and a concave inner region establishing a rim intersecting the array of lights between the convex outer region and convex inner region.

45. The rotary control module of claim 44, further comprising a plurality of lenses coupled with the array of lights mounted in the display surface such that the lenses include a first portion on the convex outer region of the surface, and a second portion on the concave inner region of the display surface.

46. The rotary control of claim 45, wherein at least one central light is located in the concave inner region of the display surface.

47. A control surface for an audio processor having a plurality of channels and a plurality of functions in the channels, comprising:

a control panel;

a plurality of sets of function select controls on the control panel, the sets coupled with corresponding channels in the plurality of channels, the sets including select switches for a predetermined set of functions executable in the corresponding channels, the select switches having first and second states, and comprising elements having first and second visually distinguishable modes by which an operator is able to determine the state of the select switch by looking at the select switch;

a function control section on the control panel, including a plurality of rotary controls for setting parameters for a selected function in a selected channel;

logic coupled with the plurality of sets of function select controls and the function control section which, in response to the state of the select switch for a selected function in the set of function select controls corresponding to a selected channel, enables application of the selected function in the selected channel to the rotary controls in the function control section to enable at least one of monitoring and control of the parameters associated with the selected function for the selected channel by the operator using the plurality of rotary controls;

wherein the rotary controls respectively comprise a stator mounted on the control panel, the stator having a proximal end adjacent the control panel and a distal end;

an array of lights on the distal end of the stator, the array of lights arranged in an arcuate pattern;

a rotor, mounted on the stator, rotatable by an operator, and having a shape near the distal end of the stator so that the array of lights is visible to the operator;

a sensor coupled with the rotor, which senses rotation of the rotor; and circuitry coupled to the sensor and the array of lights adapted to connect the sensor and the array of lights to the audio processor so that the illumination of the array of lights is controlled, in response to the sensor, to indicate a value of a parameter under control by an angular position of illuminated lights in the arcuate pattern.

48. The control surface of claim 47, wherein the lights in the array of lights on the rotary controls comprise light emitting diodes.

49. The control surface of claim 47, wherein the lights in the array of lights on the rotary controls comprise light emitting elements having a first mode and a second mode, the first mode being brighter than the second mode, so that illumination of the array of lights is controlled, in response to the sensor, to indicate a value of a parameter by illuminating a light emitting element in the first mode, and to indicate a characteristic of the parameter under control by illuminating at least on other light emitting element in the array in the second mode.

50. The control surface of claim 49, wherein the light emitting elements comprise light emitting diodes which are illuminated in response to a current, and wherein the current has a first duty cycle in the first mode and has a second duty cycle in the second mode.

51. The control surface of claim 47, wherein the sensor on the rotary controls includes a gear coupled to the rotor, and logic coupled with the circuitry which counts degrees of rotation of the gear.

52. The control surface of claim 47, wherein the sensor on the rotary controls includes an optical sensor mounted on the control panel coupled with the circuitry.

53. The control surface of claim 47, wherein the array of lights on the rotary controls includes at least 11 lights arranged in the arcuate pattern.

54. The control surface of claim 53, wherein the arcuate pattern has a radius of about 0.5 inches or less.

55. The control surface of claim 47, wherein the array of lights on the rotary controls includes at least 21 lights arranged in the arcuate pattern having a radius of about 0.3 inches or less.

56. The control surface of claim 47, wherein the control panel defines a control surface plane, and the array of lights on at least one of the rotary controls is arranged so that illumination provides a display plane, the display plane is substantially parallel with the control surface plane.

57. The control surface of claim 47, wherein the control panel is arranged to have an operator side on which the operator is normally positioned during operation of the rotary control, and defines a control surface plane, and the array of lights on at least one of the rotary controls is arranged so that illumination provides a display plane, the display plane is tilted toward the operator side relative to the control surface plane.

58. The control surface of claim 47, wherein the rotary controls include:

a switch mounted on the panel, coupled to the stator, arranged to be actuated by pushing the distal end of the stator.

59. The control surface of claim 47, wherein the rotary controls include:

a push button on the distal end of the stator; and a switch mounted on the panel, coupled to the stator, arranged to be actuated by pushing the push button on the distal end of the stator.

60. The control surface of claim 47, wherein the array of lights includes at least one central light having a controllable color mounted on the distal end of the stator, inside the arcuate pattern so that the color of the central light indicates information to the operator.

61. The control surface of claim 47, including a touch sensitive element on at least one of the rotor and the stator.

62. The control surface of claim 47, wherein the distal end of the stator comprises a display surface having a convex outer region, and a concave inner region establishing a rim intersecting the array of lights between the convex outer region and convex inner region.

63. The control surface of claim 62, further comprising a plurality of lenses coupled with the array of lights mounted in the display surface such that the lenses include a first portion on the convex outer region of the surface, and a second portion on the concave inner region of the display surface.

64. The control surface of claim 63, wherein at least one central light is located in the concave inner region of the display surface.

* * * * *